Feb. 17, 1931. O. S. GROPPER 1,792,635
LICENSE PLATE APPARATUS FOR AUTOMOBILES
Filed Nov. 15, 1927
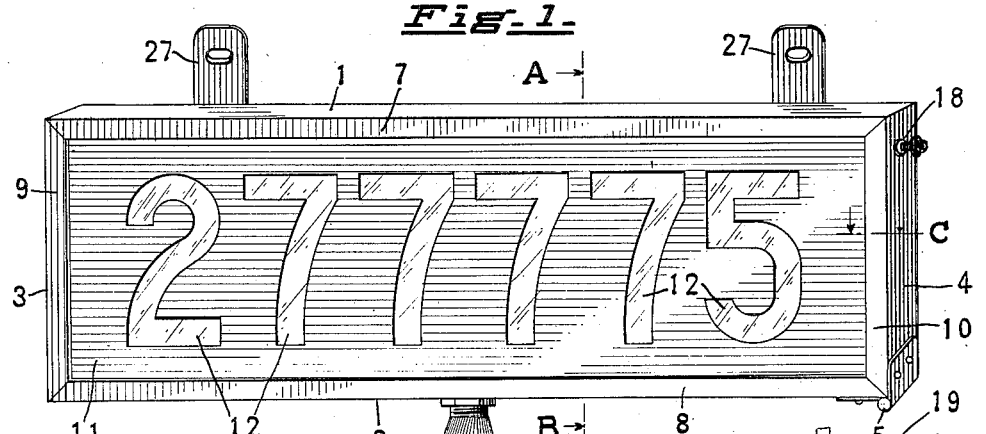
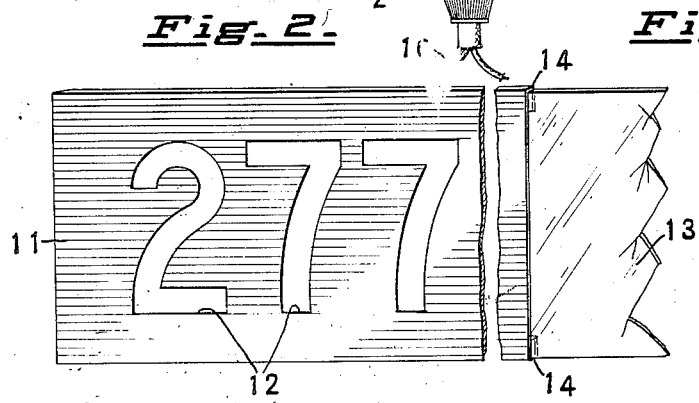
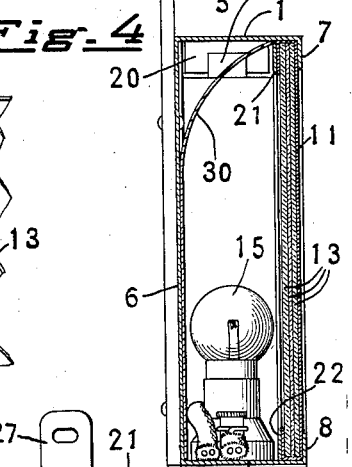
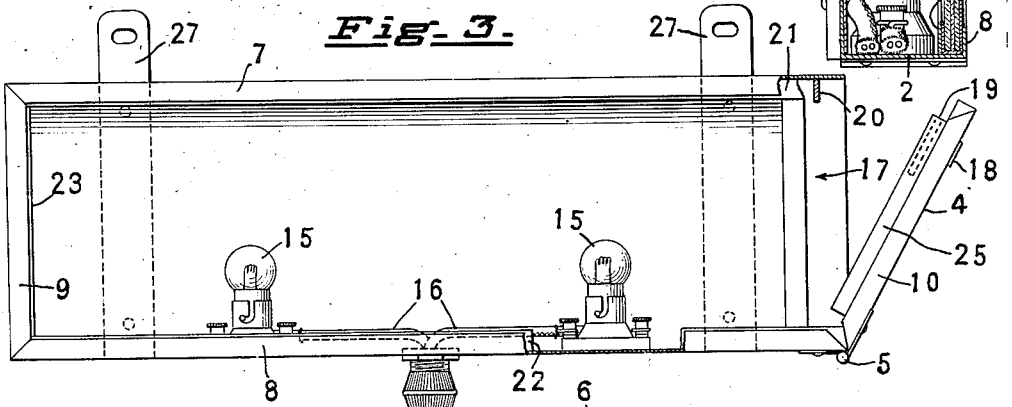
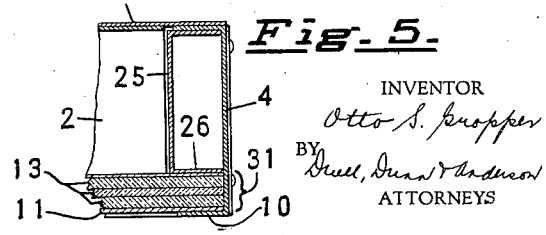
INVENTOR
Otto S. Gropper
BY
Duell, Dunn & Anderson
ATTORNEYS Patented Feb. 17, 1931

1,792,635

UNITED STATES PATENT OFFICE

OTTO S. GROPPER, OF WOODSIDE, NEW YORK

LICENSE-PLATE APPARATUS FOR AUTOMOBILES

Application filed November 15, 1927. Serial No. 233,369.

This invention relates to signal devices for automobiles, and with respect to its more specific features, to a license plate adapted to be illuminated by transmitted light, as well as plainly to be visible by reflected light, the intent being to provide a license plate structure visible in the day time or at night.

Among the objects of the invention is the provision of a practical and efficient construction, utilizing glass or other translucent material as a part of the license plate; by which the fragile material is protected; in which the parts are easy to assemble and license plates readily changed, the whole being inexpensive and strong and presenting a symmetrical appearance.

Other objects of the invention will be in part obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description in connection with the accompanying drawings, in which Fig. 1 is a perspective view of a signal device embodying the invention.

Fig. 2 is a perspective view of the license plate, partly broken away, and with one element of the license plate in partly removed position.

Fig. 3 is a front elevation of the signal device, the license plate being removed to show the interior construction.

Fig. 4 is a cross section of Fig. 1 on the line A—B.

Fig. 5 is a transverse sectional horizontal detail of Fig. 1, at the point C.

Referring now more specifically to the drawing, a housing is provided consisting of a rectangular hollow frame, having the upper and lower frame members 1, 2, an end member 3 in fixed relation to the members 1 and 2, and an end member or door 4, hinged at 5 to the member 2. The housing also includes a back plate 6 in one with members 1, 2 and 3, as by being bent therewith from a single sheet of metal, the front face of the housing including the flanges 7, 8 and 9, forming three sides of a "framing" for the license plate. The door 4, which also acts as a keeper to retain the license plate in operative position, forms one end of the housing and has a side flange 10 presented at the front of the housing, so that when the door is in closed position, as illustrated in Fig. 1, the flange 10 is continuous with the marginal flanges 7, 8 and 9 and completes the "framing" for the license plate. The inner edges of the flanges 7, 8 and 9 provide a front opening in the housing, and the license plate closes or covers this opening.

The license plate, in the present embodiment, is composed of a thin metal plate, or member 11, having the apertures 12 in the shape of numerals, or other indicia. Back of this plate 11 and closely alongside it, is a translucent plate 13 which is adapted to slide in and out between the upper and lower flanges 14 bent from the plate 11, the translucent plate being relatively closely gripped by the resilient thin metal flanges 14 so as to be removably retained in position relative to each other. The translucent plate 13 may be drawn out from between the flanges 14, and associated with another metal plate having different figures 12, as occasion demands. The metal plate 11 is preferably of a dark color, as green, to form a contrast with the appearance of the figures 12 as the latter are illuminated by the lamps in the interior of the housing. The translucent plate 13 may be of glass or other suitable translucent material and will be colored, as for instance, red, so that the figures appearing through the apertures 12 will be in color contrast to the green color of the front of the metal plate 11.

Within the housing are the electric lamps 15, removably mounted on the base 2 of the housing and having electric conductors 16 leading to the outside of the housing through an aperture in the base 2, and to a suitable source of electricity, such as a battery (not shown). When the door 4 is open the license plate may be inserted through the end opening 17 thus provided in the housing, and when in operative position the license plate will cover the front opening in the housing, and the flanges 7, 8 and 9 will overlap the outside of the license plate. When the door is closed it will retain the license plate in display or signal position, and the flange 10 will also overlap the outside of the license plate at the end of the latter, the license plate being thus "framed" as it were, in the symmetrically rectangularly related flanges 7, 8, 9 and 10. The door 4 is provided with a key-actuated lock 18 for securing it in position retaining the license plate in the housing. By turning the key the bolt 19 may be thrust in and out and is adapted to cooperate with a keeper lug 20 on the interior of the housing.

Immediately in the rear of the overhanging flanges 7, 8, 9 and 10 is an angular frame composed of the strips 21, 22, and 23, which co-act with the overhanging flanges mentioned to form a guide passageway for reception of the margin of the license plate as it slides to and from display position in the housing. Preferably the strips 21, 22, and 23, are made of pliable metal, as copper having some slight resiliency, the construction being such that the license plate is gripped between the pliable metal strips and the flanges 7, 8, 9, and 10 and held firmly and prevented from vibrating. Also projecting from the inner face of the door is the hollow metal block or strip 25, which may contain the locking mechanism. The front face 26 of the hollow block 25 is spaced from the flange 10 of the door so as to form a slot, or channel 31, for reception of the adjacent end of the license plate, when the door is in closed position. The metal block 25 also has a stiffening effect on the thin sheet metal door 4, and may be made of copper.

As best seen in Fig. 5, the hollow block 25 includes an inwardly disposed structural channel member having outwardly extending flanges, one of which forms the front face 26 of the block. Said block also includes an outwardly disposed structural channel having inwardly extending flanges overlapping the flanges of the inner channel. One of these inwardly extending flanges is the external flange 10 mentioned above. This flange 10 is spaced from the outwardly extending flange 26 of the inner channel so as to provide the channel or groove 31 for receiving the adjacent end of the license plate.

To the housing may be attached the hangers 27, by which it may be connected to the frame of the automobile.

It will be understood that when the current is on, the lamps 15 will illuminate the interior of the housing, and the light will be transmitted through the glass plate 13, and the apertures 12 in the metal plate 11, so that the license plate will be clearly visible at night. Also the figures on the license plate will be clearly visible in the day time, by reason of the contrasting colors between the figures and the front face of the metal plate 11. When the door 4 is closed and locked, the license plate and the lamps are securely held against removal. Upon unlocking the door it may be turned down on its hinge 5 and the license plate removed, whereupon the translucent and metal plates 11 and 13 may be separated and a new metal plate having other license numbers substituted. In order to increase the efficiency of illumination of the license plate, the rear inner face of the housing may be covered by a plate 30 of bright metal to serve as a reflector.

Thus by the above described construction are accomplished the objects hereinbefore referred to.

Having described my invention, what I claim as new and desire to secure by Letters Patent is:

1. A signal for automobiles including, in combination, a housing having a front opening, electric lamps in the interior of said housing, a license plate through which light is transmissible, movable into and out of position covering said opening, said license plate including a translucent member plate and an opaque apertured member plate having marginal flanges independently attaching it to said translucent member plate whereby said license plate is insertable and removable as a unit, one end of said housing movable into and out of position for retaining said plate in opening covering position and having a lock for securing it in retaining position and a slot for reception of one end of said plate, said lock including a sliding bolt mounted on the inner surface of said movable end so as to be projected into locking engagement with the housing.

2. A vehicle traffic signal including, in combination, a housing having an opening in its front face with upper and lower flanges forming margins adjacent the opening and having an end opening with a hinged door, a translucent license plate adapted to cover said front opening and insertable and removable through said end opening, an electric lamp within the housing for illuminating said translucent license plate, said housing having upper and lower channels adjacent said marginal flanges for receiving the opposite margins of said license plate when the latter is in position covering said front opening, said door having a block and a front flange spaced from one end of said block to form a channel in substantial alignment with said first mentioned channels for reception of the end of the license plate, said front flange, when the door is closed, forming a continuation of said marginal flanges of the front opening, and a locking bolt carried by said block and adapted to cooperate with the housing for locking said door in closed position.

3. A vehicle traffic signal including, in combination, a housing having an opening in its front face with upper and lower flanges forming margins adjacent the opening and having an end opening with a hinged door, a translucent license plate adapted to cover said front opening and insertable and removable through said end opening, an electric lamp within the housing for illuminating said translucent license plate, said housing having upper and lower channels adjacent said marginal flanges for receiving the opposite margins of said license plate when the latter is in position covering said front opening, said door including an inner structural channel with outwardly extending flanges and an outer structural channel with inwardly extending flanges overlapping the first mentioned flanges, the said flanges at proximate ends of said structural channels being spaced apart to provide an intermediate groove or channel aligned with the first mentioned license plate receiving channels and adapted to receive the end of the license plate, an outer flange of one of said structural channels forming, when the door is closed, a continuation of said marginal flanges of the front opening.

4. A signal for automobiles including, in combination, a housing having an opening in its front face with upper and lower marginal flanges and an end opening having a hinged door, a license plate adapted to cover said front opening and insertible and removable through said end opening, said license plate composed of parallel metal and translucent member plates removably attached together, said metal plate having apertures through which said translucent plate is visible, said member plates differing in color from each other, electric lamps for illuminating the interior of said housing, and pliable metal strips coacting with said face to provide upper and lower channels for reception of opposite margins of said license plate when covering said front opening, said door having a channel positioned in substantial alignment with said first mentioned channels so as to receive and support the adjacent end of said license plate when said hinged door is swung into closed position and to disengage and free said license plate end when the door is opened so as to free the plate to removal, said door having a front flange forming a continuation of said marginal flanges of the front opening when the door is in closed position.

In testimony whereof I affix my signature.

OTTO S. GROPPER.